(12) United States Patent
Rune et al.

(10) Patent No.: US 12,075,466 B2
(45) Date of Patent: Aug. 27, 2024

(54) INDICATION OF DOWNLINK CLEAR CHANNEL ASSESSMENT FAILURES

(71) Applicant: Telefonaktiebolaget LM Ericsson (PUBL), Stockholm (SE)

(72) Inventors: Johan Rune, Lidingö (SE); Min Wang, Luleå (SE); Iana Siomina, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 388 days.

(21) Appl. No.: 17/598,425

(22) PCT Filed: Mar. 27, 2020

(86) PCT No.: PCT/IB2020/052934
§ 371 (c)(1),
(2) Date: Sep. 27, 2021

(87) PCT Pub. No.: WO2020/194261
PCT Pub. Date: Oct. 1, 2020

(65) Prior Publication Data
US 2022/0183055 A1 Jun. 9, 2022

Related U.S. Application Data

(60) Provisional application No. 62/825,070, filed on Mar. 28, 2019.

(51) Int. Cl.
*H04W 74/00* (2009.01)
*H04W 74/0816* (2024.01)
(Continued)

(52) U.S. Cl.
CPC ....... *H04W 74/008* (2013.01); *H04W 74/006* (2013.01); *H04W 74/0816* (2013.01); *H04W 76/10* (2018.02); *H04W 80/02* (2013.01)

(58) Field of Classification Search
CPC ............. H04W 74/008; H04W 74/006; H04W 74/0816; H04W 76/10; H04W 80/02;
(Continued)

(56) References Cited

U.S. PATENT DOCUMENTS

| 2015/0103777 A1* | 4/2015 | Chen ...................... H04L 69/14 370/329 |
| 2015/0280847 A1* | 10/2015 | Somasundaram ........ H04L 1/20 370/252 |

(Continued)

FOREIGN PATENT DOCUMENTS

WO    2017 026440 A1    2/2017

OTHER PUBLICATIONS

3GPP TSG-RAN WG2 Meeting #103bis; Chengdu, China; Source: vivo; Title: Evaluation of the RLM for NR-U (R2-1814267 (Revision of R2-1811788))—Oct. 8-12, 2018.

(Continued)

*Primary Examiner* — Rownak Islam
(74) *Attorney, Agent, or Firm* — Baker Botts L.L.P.

(57) ABSTRACT

According to some embodiments, a method performed by a wireless device for detecting a downlink radio failure comprises: establishing a wireless connection with a network node using unlicensed radio spectrum; receiving an indication that the network node incurred a clear channel assessment (CCA) failure in a prior attempt to communicate with the wireless device; and in response to the indication of the CCA failure, determining whether to trigger a radio failure condition.

26 Claims, 11 Drawing Sheets

400

412 – establish a wireless connection with a network node using unlicensed radio spectrum

↓

414 – receive an indication that the network node incurred a clear channel assessment (CCA) failure in a prior attempt to communicate with the wireless device

↓

416 – determine whether to trigger a radio failure condition

(51) Int. Cl.
*H04W 76/10* (2018.01)
*H04W 80/02* (2009.01)

(58) Field of Classification Search
CPC . H04W 72/20; H04W 16/14; H04W 74/0808;
H04W 72/23; H04W 76/18
USPC ......................................................... 370/329
See application file for complete search history.

(56) References Cited

U.S. PATENT DOCUMENTS

2017/0231011 A1* 8/2017 Park ................. H04W 72/0446
2021/0243808 A1* 8/2021 Deenoo ................. H04L 5/005
2021/0392683 A1* 12/2021 Awadin ................. H04B 7/088

OTHER PUBLICATIONS

3GPP TSG-RAN WG2 Meeting #105; Athens, Greece; Source: ZTE corporation, Sanechips; Title: Discussion for RLM/RLF for NR-U (R2-1900672)—Feb. 25-Mar. 1, 2019.
3GPP TSG RAN WG2 #105; Athens, Greece; Source: Ericsson; Title: Handling UL LBT failures (Tdoc R2-1901674)—Feb. 25-Mar. 1, 2019.
3GPP TSG-RAN WG2 #105; Athens, Greece; Source: Ericsson; Title: Scheduling request for NR-U (Tdoc R2-1901676 (Revision of R2-1817974))—Feb. 25-Mar. 1, 2019.
PCT International Search Report issued for International application No. PCT/IB2020/052934—Jul. 22, 2020.
PCT Written Opinion of the International Searching Authority issued for International application No. PCT/IB2020/052934—Jul. 22, 2020.
Official Communication issued for Japanese Patent Application 2021-557548—Oct. 4, 2022.

* cited by examiner

INDICATION OF DOWNLINK CLEAR CHANNEL ASSESSMENT FAILURES

PRIORITY

This nonprovisional application is a U.S. National Stage Filing under 35 U.S.C. § 371 of International Patent Application Serial No. PCT/IB2020/052934 filed Mar. 27, 2020 and entitled "INDICATION OF DOWNLINK CLEAR CHANNEL ASSESSMENT FAILURES" which claims priority to U.S. Provisional Patent Application No. 62/825,070 filed Mar. 28, 2019 both of which are hereby incorporated by reference in their entirety.

TECHNICAL FIELD

Particular embodiments relate to wireless communication, and more specifically to an indication of downlink clear channel assessment (CCA) failures.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Third Generation Partnership Project (3GPP) is a standardization body that specifies standards for several international cellular systems building on global system for mobile communication (GSM), general packet radio service (GPRS) and enhanced data rates for global evolution (EDGE) (which were standardized by the European Telecommunications Standards Institute (ETSI)), and include wideband code division multiple access (WCDMA), long term evolution (LTE) and a the fifth generation (5G) system new radio (NR) and its counterpart on the core network side, next generation core (NGC). The standards are to varying degrees maintained (e.g., error corrections) and evolved, but currently the focus of 3GPP is the completion of basic functionality and further evolution of NR and NGC.

3GPP has traditionally standardized cellular systems for licensed spectrum, where a single operator has exclusive access to one or multiple portion(s) of the spectrum at any one place or area (or multiple operators share spectrum availability through a common shared network which is operated in spectrum range(s) covered by an acquired license), such as a country. However, for LTE and NR, 3GPP has extended its scope to specify operation of the systems also in unlicensed spectrum.

For LTE, 3GPP has only specified such operation in terms of license assisted access (LAA), where an LTE cell in unlicensed spectrum operates in carrier aggregation or dual connectivity mode with one or more LTE cell(s) in licensed spectrum (also called "tight interworking"), acting as primary carrier and/or master cell group. A separate forum called Multefire has specified stand-alone operation of LTE cells in unlicensed spectrum.

For NR, operation in unlicensed spectrum is not part of the first release of the standard (3GPP release 15), but it is planned for the second release (3GPP release 16). Both tight interworking and stand-alone operation will be specified by 3GPP. NR operation in unlicensed spectrum is denoted NR-U.

Operation in unlicensed spectrum is inherently different from operation in licensed spectrum. The unlicensed spectrum may be shared by multiple networks, including networks operating according to different standards, e.g. LTE-LAA or Wi-Fi. Although a guiding principle in the NR specification work is to reuse as much as possible from regular NR (i.e., NR operating in licensed spectrum), NR-U will have to conform to the regulatory requirements of operation in unlicensed spectrum. This includes the listen-before-talk (LBT) principle, where a device/node must perform a clear channel assessment (CCA) with positive outcome (no detected transmission in the radio channel/spectrum it intends to transmit in) before it may initiate a transmission.

A CCA consists of monitoring the channel for a certain specified time and measuring the received energy (and/or, in Wi-Fi, checking for preamble transmission indicating the beginning of another device's transmission). To allow a transmission from a device, the received energy must be below a certain threshold (and/or no Wi-Fi preamble must be detected/received above a certain threshold) for the channel to be assessed as clear.

After sensing the channel and assessing it to be idle, the device/node is typically allowed to transmit for a certain amount of time, sometimes referred to as the channel occupancy time (COT) or maximum channel occupancy time (MCOT). The maximum allowed length of the COT depends on regulation and type of CCA (e.g., the length of time the medium was sensed) that has been performed, but typically ranges from 1 ms to 10 ms. Gaps up to 16 us are allowed in the transmission without performing an additional CCA. The CCA-free 16 us gap accommodates the turn-around time from reception of a transmission to acknowledgement of the transmission in Wi-Fi.

NR-U may include a similar gap to accommodate the radio turnaround time. This enables the transmission of a physical uplink control channel (PUCCH) carrying uplink control information (UCI) feedback as well as a physical uplink shared channel (PUSCH) carrying data and possibly UCI without the CCA before the PUSCH/PUCCH transmission (if the gap between downlink and uplink transmission is less than or equal to 16 μs). Another option in case the gap is larger than 16 us is for the UE to perform a short 25 μs CCA. Operation in this manner is typically referred to as "COT sharing". FIG. 1 illustrates a transmission opportunity both with and without COT sharing after a successful CCA at the gNB.

FIG. 1 is subframe diagram illustrating transmission opportunities both with and without COT sharing. In both cases, the initiating node (e.g., the gNB) performs the CCA. For COT without sharing, after successful CCA, the gNB uses the subsequent subframes for downlink transmission.

For COT with sharing, after a successful CCA, the gNB uses a portion of the COT for downlink transmission in the subsequent subframes, followed up uplink transmission from the user equipment (UE). The gap between downlink and uplink is less than 16 μs.

The CCA/LBT mechanism, and other properties that are specific to operation in unlicensed spectrum, causes NR-U to deviate from regular NR and adapt the functionality. For example, the network can configure or allocate time windows instead of single occasions or a surplus of transmission occasions to compensate for potential CCA failures (i.e., to increase the chances of transmission success despite potential CCA failures). Examples when this may be used include system information (SI) transmissions, paging transmissions, PUCCH transmissions, etc. Other ways of adapting to operation in unlicensed spectrum include, e.g., behavioral adaptations to accommodate the risk that a reference signal or data transmission expected to be received is absent (and that this may be due to CCA failure rather than a poor channel quality or lost radio link).

Another consequence of operation in unlicensed spectrum is that networks operated by different operators may share the same spectrum in the same location. The unlicensed spectrum may be divided into parts/subbands, sometimes referred to as channels, typically consisting of 20 MHz each. The parts/subbands may mitigate problems caused by the spectrum sharing in the unlicensed spectrum. A network can selectively choose to operate in only one or more of such spectrum parts/channels.

In NR-U, such spectrum parts/channels may be referred to as bandwidth parts (BWPs), reusing the term and concept from regular NR, where a BWP is a part of the full carrier bandwidth, which can be allocated to UEs in RRC CONNECTED and/or RRC NATIVE and RRC IDLE state. A network may mitigate the problem of spectrum sharing by favoring operation in less loaded channels, i.e., channels for which the channel occupancy is low.

CCA/LBT may be separated into categories. As described above, LBT is designed for unlicensed spectrum co-existence with other radio access technologies (RATs) and other users of the system and the medium. In this mechanism, a radio device applies a CCA check before any transmission. The transmitter involves energy detection (ED) over a time period compared to a certain threshold (ED threshold) to determine if a channel is idle. Another CCA mechanism is to detect a known preamble. In case the channel is determined to be occupied, the transmitter performs a random back-off within a contention window before the next CCA attempt.

To protect the ACK transmissions, the transmitter defers a back-off period after each busy CCA slot prior to resuming CCA. When the transmitter has grasped the channel, the transmitter is only allowed to perform transmission up to a maximum time duration called the maximum channel occupancy time (MCOT). For QoS differentiation, a channel access priority scheme based on the service type has been defined. For example, in LTE-LAA four CCA/LBT channel access priority classes (CAPCs) are defined for differentiation of contention window sizes (CWS) and MCOT between services. In LTE-LAA the following mapping between CAPC and quality of service class identifiers (QCIs) is defined in 3GPP TS 36.300:

| Channel Access Priority Class (p) | QCI |
|---|---|
| 1 | 1, 3, 5, 65, 66, 69, 70 |
| 2 | 2, 7 |
| 3 | 4, 6, 8, 9 |
| 4 | — |

Therefore, when scheduling uplink/downlink traffic, the eNB/gNB should consider the QCI of the traffic to be transmitted. For uplink, the CAPC that the UE uses for a given uplink transmission is either signaled in the uplink grant on the PDCCH for dynamic scheduling or indicated as part of a logical channel configuration for autonomous LTE-LAA uplink transmissions. In the latter case, the UE applies the CAPC indicated in the logical channel configuration when autonomously transmitting data from that logical channel In case there are multiple medium access control (MAC) service data units (SDUs) multiplexed in the same MAC protocol data unit (PDU) and associated with different logical channels, the UE applies the lowest CAPC (the highest p in the table above) of all the logical channels included in the MAC PDU.

The channel access schemes for NR-based access for unlicensed spectrum can be classified into the following categories.

Category 1 includes immediate transmission after a switching gap no longer than 16 μs. This is used for a transmitter to immediately transmit after a uplink/downlink switching gap inside a COT. The reason for the switching gap from reception to transmission is to accommodate the transceiver turnaround time.

Category 2 includes CCA/LBT without random back-off. The duration of time that the channel is sensed to be idle before the transmitting entity transmits is deterministic.

Category 3 includes CCA/LBT with random back-off with a contention window of fixed size. The CCA/LBT procedure has the following procedure as one of its components. The transmitting entity draws a random number N within a contention window. The size of the contention window is specified by the minimum and maximum value of N. The size of the contention window is fixed. The random number N is used in the CCA/LBT procedure to determine the duration of time that the channel is sensed to be idle before the transmitting entity transmits on the channel.

Category 4 includes CCA/LBT with random back-off with a contention window of variable size. The LBT procedure has the following as one of its components. The transmitting entity draws a random number N within a contention window. The size of contention window is specified by the minimum and maximum value of N. The transmitting entity can vary the size of the contention window when drawing the random number N. The random number N is used in the CCA/LBT procedure to determine the duration of time that the channel is sensed to be idle before the transmitting entity transmits on the channel.

CCA/LBT failures may be used to trigger radio link failure (RLF). For example, consistent or too frequent CCA failures may trigger RLF. This has also been specified for LTE-LAA. RLF declaration and subsequent radio link reestablishment are UE autonomous procedures. Accordingly, uplink CCA failures are easily incorporated, because they are experienced directly by the UE. However, downlink CCA failures can only be indirectly detected by a UE, e.g. due to lack of reception, or possibly a delay of the reception, of a discovery reference signal (DRS) in accordance with the repetitive schedule of the DRS in the cell. In addition, it is inherently difficult for a UE to distinguish between cases where the lack of reception of a DRS is caused by CCA failure(s) at the gNB or caused by a bad downlink radio channel A solution where the UE makes this distinction based on the amount of detected energy or power level has been suggested and specified for LTE-LAA.

There currently exist certain challenges. For example, the UE might not know whether lack of detection/reception of an expected DRS is caused by CCA failure or a bad channel. The LTE-LAA method relying on an energy/power threshold is uncertain and thus prone to errors. This may have significant impacts on any procedure relying on detection of downlink CCA failures, such as RLF declaration.

SUMMARY

As described above, certain challenges currently exist with detecting radio link failures in unlicensed radio spectrum. Certain aspects of the present disclosure and their embodiments may provide solutions to these or other challenges.

For example, particular embodiments provide a user equipment (UE) with explicit information about downlink clear channel assessment (CCA) failures. The UE may use the information as input to procedures such as radio link management (RLM) and radio link failure (RLF) declaration and/or cell reselection and/or reselection to another frequency. A radio base station (gNB or possibly eNB) includes the CCA information in physical broadcast channel (PBCH) payload bits outside the master information block (MIB) or in the system information (where updates of the information should not trigger system information update notifications).

More specifically, particular embodiments provide the UE with more accurate detection and/or counting of downlink CCA failures or determine downlink CCA failure rate or other statistics. Instead of letting the UE rely on absence of an expected discovery reference signal (DRS) and on an associated energy or power threshold, the gNB can explicitly indicate recent occurrences of CCA failure, e.g., associated with DRS transmission attempts. Some embodiments leverage a repetitively broadcast signal, message or channel. The PBCH is one candidate, which provides frequent, accessible downlink CCA failure information to the UE.

It may be the case that the CCA information needs frequent updates. In some scenarios this may counteract the goal of keeping the MIB soft-combining-friendly (across every set of four repetitions in a transmission time interval (TTI), and also across the beams in a beam sweep). Therefore, in such scenarios it may be desirable that the CCA information not be included in the MIB on the PBCH. Instead, particular embodiments use PBCH payload bits outside the MIB. For example, some embodiments may use two available bits which are unused in deployments where the maximum allowed number of (SSB) beams is 64, which is the case of NR-U (which only uses a maximum of 8 beams).

Another alternative, which is not as restricted in the number of bits that can be used, and which thus can provide richer CCA information, is the system information. Because the CCA information may need to be updated frequently, potentially with every transmission, in some scenarios it may be desirable for changes of it to not trigger a system information update notification.

The CCA information can be as simple as a binary indication of the CCA in the DRS transmission attempt preceding the transmission of the CCA information. Using more than one bit, more preceding transmission attempts can be reflected and if enough bits are used, the entire period between two CCA information transmissions may be covered. Refined/processed CCA information is also an alternative, such as the CCA failure rate or the ratio between CCA failures and the total number of CCAs, possibly represented in the form of an exponential average.

In embodiments in multi-beam operation, the indication may apply only to results of possible transmission attempts of the same DRS beam (i.e., in the same direction as the CCA indication is transmitted) in the present DRS measurement timing configuration (DMTC) window or it could apply to all DRS beams accumulated. The choice between CCA failure indication for the same beam direction and CCA failure indication for any beam direction may depend on whether the CCA is directional, i.e., monitoring the channel (the common medium) only in the direction of the planned beam transmission, or non-directional, monitoring the channel (the common medium) in all directions. In some embodiments, the CCA information applies to a subset of the DRS beams, e.g. the beam the CCA information is transmitted in and the one, two or more adjacent beams on both sides of the beam direction used for transmitting the CCA information.

In particular embodiments, the scope of the CCA information is extended so that the CCA information comprises information related to the CCA failures (and/or successes) in conjunction with any type of downlink transmission attempts, i.e. not limited to DRS transmission attempts.

According to some embodiments, a method performed by a wireless device for detecting a downlink radio failure comprises: establishing a wireless connection with a network node using unlicensed radio spectrum; receiving an indication that the network node incurred a CCA failure in a prior attempt to communicate with the wireless device; and in response to the indication of the CCA failure, determining whether to trigger a radio failure condition.

In particular embodiments, the indication of the CCA failure is received via a physical PBCH. The indication of the CCA failure may be received outside of the MIB of the PBCH. The indication of the CCA failure may be received via a system information block (SIB). The indication of the CCA failure may be received via a group common physical downlink control channel (GC-PDCCH). The indication of the CCA failure may be received together with at least one of downlink control information (DCI), medium access control (MAC) control element (CE), and radio resource control (RRC) signaling.

In particular embodiments, the indication of the CCA failure comprises a single bit and indicates whether one more CCA failures occurred. Thee indication of the CCA failure may comprise more than a single bit and indicate an amount of CCA failures that occurred.

In particular embodiments, the indication of the CCA failure comprises an indication of an availability of channels or carriers.

In particular embodiments, the indication of the CCA failure is related to one or more beams. The indication of the CCA failure may be related to one or more beams that correspond to a beam on which the wireless device received the indication of the CCA failure.

In particular embodiments, the indication of the CCA failure comprises a ratio of CCA failures to successful transmissions by the network node to the wireless device.

In particular embodiments, the network node incurred the CCA failure when attempting to transmit a reference signal to the wireless device.

According to some embodiments, a wireless device comprises processing circuitry operable to perform any of the network node methods described above.

According to some embodiments, a method performed by a network node comprises: determining a CCA failure occurred when attempting to communicate with a wireless device using unlicensed radio spectrum; determining the network node is able to communicate with the wireless device using unlicensed spectrum; and transmitting, to the wireless device, an indication that the network node incurred the CCA failure in the prior attempt to communicate with the wireless device.

In particular embodiments, the indication of the CCA failure is transmitted via a PBCH. The indication of the CCA failure may be transmitted outside of the MIB of the PBCH. The indication of the CCA failure may be transmitted via a SIB. The indication of the CCA failure may transmitted via a GC-PDCCH. The indication of the CCA failure may be transmitted together with at least one of DCI, MAC CE, and RRC signaling.

In particular embodiments, the indication of the CCA failure comprises a single bit and indicates whether one more CCA failures occurred. The indication of the CCA failure may comprise more than a single bit and indicate an amount of CCA failures that occurred.

In particular embodiments, the indication of the CCA failure comprises an indication of an availability of channels or carriers.

In particular embodiments, the indication of the CCA failure is related to one or more beams. The indication of the CCA failure may be related to one or more beams that correspond to a beam on which the network node transmitted the indication of the CCA failure.

In particular embodiments, the indication of the CCA failure comprises a ratio of CCA failures to successful transmissions by the network node to the wireless device.

In particular embodiments, the network node incurred the CCA failure when attempting to transmit a reference signal to the wireless device.

According to some embodiments, a network node comprises processing circuitry operable to perform any of the network node methods described above.

Also disclosed is a computer program product comprising a non-transitory computer readable medium storing computer readable program code, the computer readable program code operable, when executed by processing circuitry to perform any of the methods performed by the wireless device described above.

Another computer program product comprises a non-transitory computer readable medium storing computer readable program code, the computer readable program code operable, when executed by processing circuitry to perform any of the methods performed by the network node described above.

Certain embodiments may provide one or more of the following technical advantages. For example, particular embodiments provide information for a UE to accurately determine the CCA failure/success situation at the gNB. This in turn enables the UE to use downlink CCA failures as reliable input to processes such as RLM and RLF declaration and/or cell reselection and/or reselection to another frequency.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
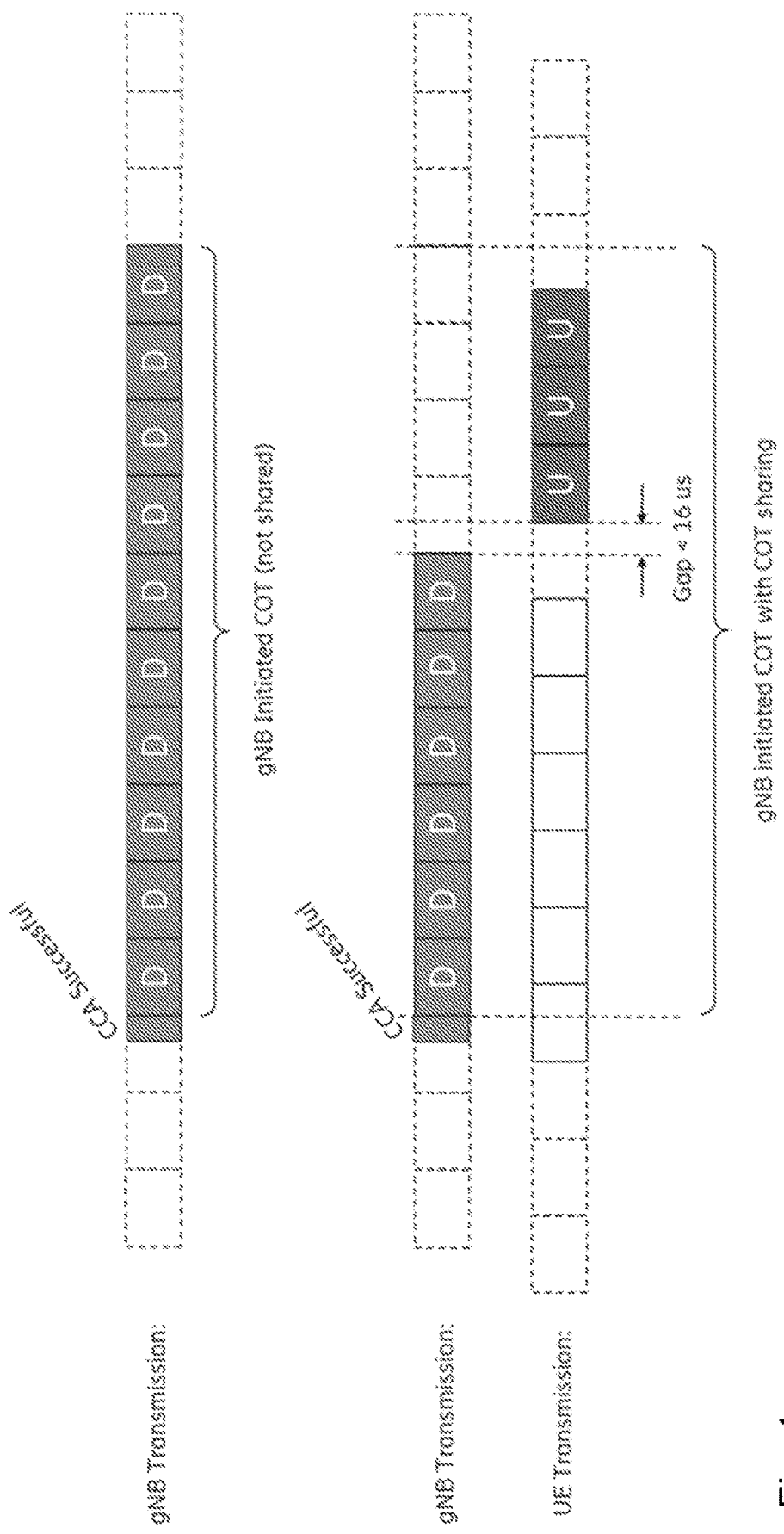
FIG. 1 is subframe diagram illustrating transmission opportunities both with and without COT sharing.

As described above, certain challenges currently exist with detecting radio link failures in unlicensed radio spectrum. Certain aspects of the present disclosure and their embodiments may provide solutions to these or other challenges.

Particular embodiments are described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Some embodiments provide a user equipment (UE) with information to detect and/or count downlink clear channel assessment (CCA) failures or determine downlink CCA failure rate or other statistics. Instead of the UE relying on the absence of an expected discovery reference signal (DRS) and on an associated energy or power threshold, the gNB may explicitly indicate recent occurrences of CCA failure. Particular embodiments may use a repetitively broadcast signal, message or channel.

In some embodiments, the physical broadcast channel (PBCH) is used, which can provide frequent, easily accessible downlink CCA failure information to the UE. However, including an indication in the master information block (MIB), which is transmitted on the PBCH, is not a good solution. This is because the MIB should allow for combining transmissions. Thus, the same MIB should be transmitted across four broadcast periods (i.e., four consecutive broadcast transmissions representing four repetitions within one MIB transmission time interval (TTI)), and across all beam transmissions in a beam sweep. Instead, in particular embodiments the downlink CCA failure information indicated by PBCH payload bits outside the MIB (where other information which is too dynamic for inclusion in the MIB is already encoded, e.g. beam index and system frame number (SFN) low order bits).

The indication may inform the UE of how many CCA failures for DRS transmission attempts that precedes the successful transmission in the DRS measurement timing configuration DMTC window. Alternatively, some embodiments may use a more limited indication about the preceding CCA successes/failures in the DMTC window.

For example, in some embodiments a single bit could be used to indicate to the UE whether the preceding DRS transmission (in the same beam direction) was successful (i.e., preceded by a successful CCA) or unsuccessful (i.e., preceded by an unsuccessful CCA). The indication may refer to the (possible) preceding PBCH transmission attempt in the same beam direction in the DMTC window. Alternatively, the indication may refer to the preceding PBCH transmission attempt in any beam direction in the same DMTC window. If there is no relevant preceding PBCH transmission attempt in the same DMTC window, then the information may either indicate "no CCA failure" or, alternatively, refer to the outcome of the preceding PBCH transmission attempt (in the same beam direction or any beam direction) in the preceding DMTC window.

The current NR specifications specify two PBCH payload bits that are only used when the maximum number of SSB/DRS beams is 64. Because NR-U may use a maximum of 8 SSB/DRS beams, the two bits are available and particular embodiments may use them for the type of indications described above. Adding new PBCH payload bit(s) is also an option, but a drawback is that it increases the size of the transmitted PBCH data.

For embodiments that use two PBCH payload bits, the two bits may indicate the number of preceding CCA failures in the same DMTC window (e.g., where 11 (binary) may indicate "3 or more"). Again, the bits may refer to transmission attempts in the same beam direction or any beam direction. If three PBCH payload bits are used, up to "7 or more" preceding CCA/LBT failures may be indicated.

In some embodiments, the indication may be an ASN.1 ENUMERATED type, e.g. indicating 4 (if two bits are used) or 8 (if three bits are used) ranges of numbers of preceding CCA failures, e.g. "0", "1-2", "3-5", "6-8", etc. In multi-beam operation, the indication may apply to results of possible transmission attempts of the same DRS beam in the present DMTC window or it may apply to all DRS beams accumulated.

The choice between CCA failure indication for the same beam direction and CCA failure indication for any beam direction may depend on whether the CCA is directional, i.e., monitoring the channel (the common medium) only in the direction of the planned beam transmission, or non-directional, monitoring the channel (the common medium) in all directions. In some embodiments, the CCA information applies to a subset of the DRS beams, e.g. the beam the CCA information is transmitted in and the one, two or more adjacent beams on both sides of the beam direction used for transmitting the CCA information.

In some embodiments, which are less restricted in number of bits and thus allow more extensive, information-rich CCA failure indications, the indication is included in the system information (SI), e.g. in SIB1 (e.g., together with the ssb-PositionsInBurst IE). SIB1 is periodically broadcast (unless prevented by CCA failure) and is a suitable SIB for the CCA failure indication, but the CCA information could be included in any other SIB too, i.e. one that could be either periodically broadcast or provided on request. In some embodiments, the indication may be included in a new SIB.

The CCA failure indication parameter, or parameters, may be updated often, potentially with every transmission, and thus it/they should not necessarily trigger an SI update notification (which otherwise would be transmitted on the paging channel). Optionally, it/they should not affect the value tag associated with the SIB (other than SIB1) either, but some embodiments may let it/them affect the associated value tag, just like any other parameter in the same SIB.

To limit the update frequency of the concerned SIB due to updates of the CCA information, some embodiments may define update triggering conditions such that the value tag is only affected by changes in the CCA information when the change is significant, e.g. exceeding a certain threshold (X). To avoid continuous small changes, some embodiments define repetitive monitoring periods and the CCA information acquired during a monitoring period is compared with the CCA information acquired during the preceding monitoring period (or the accumulated CCA information after monitoring period n could be compared with the accumulated CCA information after monitoring period n−1).

For example, the SIB's value tag may remain unchanged unless the ratio between the number of CCA failures and the total number of downlink transmission attempts increases or decreases more than X amount between two monitoring periods. In some embodiments, the number of CCA failures detected during the last monitoring period is X greater or smaller than during the preceding monitoring period.

If a new SIB is used for the CCA information, particular embodiments may use an associated value tag, which may be updated every time the CCA information changes (or updated only after significant CCA information changes, as described above). In some embodiments, the new SIB may not have an associated value tag. In any case, update of the CCA information may not trigger an SI update notification.

Because an indication in a SIB in the system information can consist of more bits than an indication on the PBCH, it could include richer CCA information. For example, in some embodiments the CCA information could indicate the exact number of preceding CCA failures and/or the exact number of preceding CCA successes. Other examples include the ratio between the number of CCA failures (or CCA successes) and the total number of CCA attempts (which should be the same as the total number of transmission attempts), possibly accompanied by the total number of CCAs (or the number of CCA failures or the number of CCA successes).

A SIB (or optionally multiple SIBs) in the system information may optionally include both CCA information pertaining to the present beam direction and CCA information pertaining to all beam directions accumulated. In some embodiments, the CCA information contained in a SIB is divided into CCA information per beam direction (e.g., DRS beams identified by beam indexes). This may be advantageous, for example, for a UE configured with multiple RLM reference signals. Some embodiments may provide rich CCA information such as CCA information per channel, subband (of a bandwidth part (BWP)) or BWP and/or (if the scope of the CCA information is extended to cover also non-DRS transmission attempts as described below) CCA information per channel access priority class (CAPC).

In variations of the above described embodiments, the scope of the downlink CCA failures that the CCA failure indication comprises may be extended. For example, the RS transmissions outside of the DRS window may be covered in the CCA information, because those samples may be considered by RRM and RLM procedures. In a variation, or embodiment, with even larger CCA information scope, the CCA information may include information related to the CCA failures with any type of downlink transmission attempts, i.e. not limited to DRS or RS transmission attempts.

For example, the gNB may indicate in the PBCH payload bits or in the system information, the number of CCA failures (including all downlink transmission attempts) during the last time period T. The period T may be, for example, the DRS periodicity, if PBCH payload bits are used, or the SIB periodicity if the CCA information is included in a SIB. Alternatively, the period T may be the time since the last CCA failure indication was transmitted in the same beam direction, or T could be any suitable time period, which could be larger or smaller than the DRS periodicity or SIB periodicity.

In some embodiments, the indicated CCA information consists of the ratio between the number of CCA failures and the total number of CCAs (or the ratio between the number of CCA successes and the total number of CCAs). The indication may optionally be accompanied by the total number of CCAs (or the number of CCA failures or the number of CCA successes). If such a ratio is indicated, then, instead of basing it on a certain period T, it may be calculated as an exponential average (but then without an accompanied indication of the total number of CCAs, CCA failures or CCA successes).

In some embodiments, indicating a ratio (e.g., the ratio between the number of CCA failures and the total number of CCAs) may be more appropriate than indicating the number of CCA failures, because the number of CCA failures may be dependent on the number of downlink transmission attempts, which is unknown to the UE. Some embodiments may alleviate the uncertainty by indicating the total number of CCAs together with the number of CCA failures or together with the ratio. Some embodiments may indicate an exponential average of the CCA failure rate, i.e. the number of CCA failures per time unit. Some embodiments indicate a leaky bucket value for the downlink CCA failures.

A complication may arise unless care is taken to ensure that indicated CCA information is consistent with regards to beam directions. For example, for directional CCA, if all downlink transmission attempts are accounted for in the CCA failure information, the preceding directional CCAs (which may have failed or succeeded) may have been performed in any direction, in which case many of the CCA results may be irrelevant (or at least less relevant) for a specific UE, e.g. when/if the UE uses the information to assess the usefulness of the radio link, because the CCAs may concern other directions than the direction towards the UE. This is because in a beamforming-based system, a UE may (in some embodiments) be interested only in CCA information concerning downlink transmission attempts in its own direction (i.e., in the direction towards the UE). This is further complicated if the granularity of the beam directions and beam widths is fine, e.g. using beam directions and beam widths tailored for specific UEs, and especially if digital downlink beamforming is used, which allows great flexibility in a beam's shape, width and direction. Thus, in some embodiments the gNB only includes the CCA statistics from CCAs performed in (at least reasonably) the same direction as the beam in which the CCA information indication is transmitted.

Assuming the gNB behaviour described above, if the UE receives CCA information transmitted in multiple beams (e.g., because one beam reaches the UE through a line of sight path while one or more other beam(s) reach(es) the UE via reflection(s) or refraction), then there are different options for how the UE handles the different CCA indications. In some embodiments, the UE considers only the CCA information in the "best" beam (where "best" e.g. could be the strongest, i.e. highest received power, or the one with the highest signal to noise ratio (SNR) or signal to interference plus noise ratio (SINR)) and ignores the others. In some embodiments, the UE considers the CCA information in all beams received above a certain threshold (in terms of e.g., received power, SNR or SINR).

In some embodiments, the UE considers the CCA information in all the beams it receives. If the CCA information of multiple beams is considered, in some embodiments the UE accumulates them or averages across them (possibly using a weighted average, e.g., based on how well the beams are received in terms of received power, SNR or SINR) or, if the CCA information consists of a binary indication (e.g., indicating success or failure of the CCA in conjunction with the preceding transmission attempt), uses the indications as "votes" (possibly weighted votes, e.g., based on how well the beams are received in terms of received power, SNR or SINR, or giving the best received beams two votes or 1.5 votes or casting vote), where a majority decision (e.g., success or failure) is the result. In some embodiments, the extended variation, where non-DRS transmissions are considered, is used if non-directional CCA is used.

In the EN-DC case, with an LTE cell acting as PCell and an NR-U cell acting as PSCell or SCell, the CCA information pertaining to the NR-U cell is optionally conveyed to a UE via dedicated RRC signaling (or some other signaling) via the LTE cell.

For any of the above embodiments, the CCA information may be carried/indicated by a channel occupancy time (COT) structure/information signaling such as a group common physical downlink control channel (GC-PDCCH). To provide more information bits, the CCA information may be carried together with other signaling means such as other UE dedicated or group specific DCI, MAC CE or RRC signaling.

Figure 2:
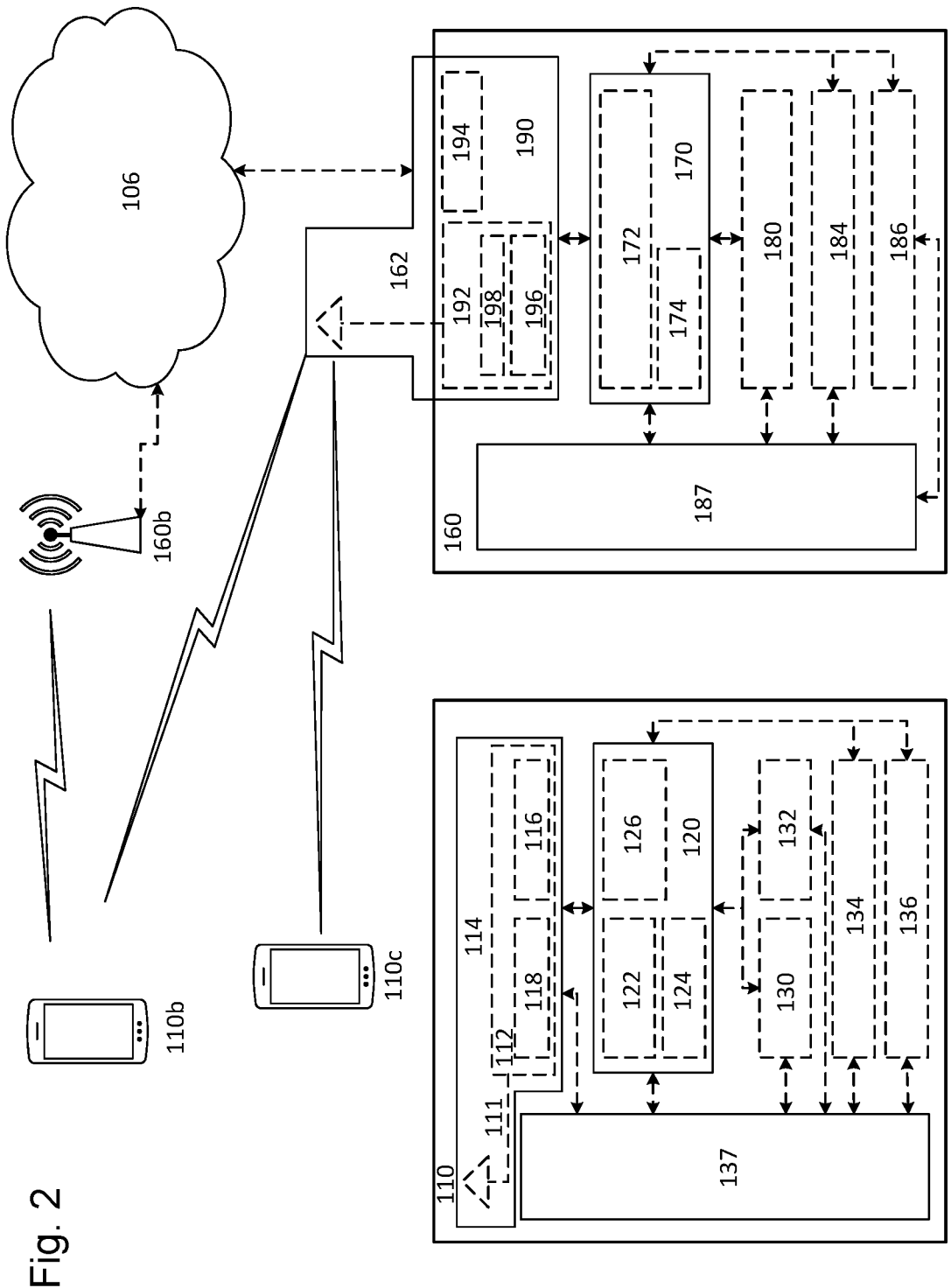
FIG. 2 is a block diagram illustrating an example wireless network.

FIG. 2 illustrates an example wireless network, according to certain embodiments. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), New Radio (NR), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs.

As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 2, network node 160 includes processing circuitry 170, device readable medium 180, interface 190, auxiliary equipment 184, power source 186, power circuitry 187, and antenna 162. Although network node 160 illustrated in the example wireless network of FIG. 2 may represent a device that includes the illustrated combination of hardware components, other embodiments may comprise network nodes with different combinations of components.

It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node.

In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality.

For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB, gNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162.

Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160.

For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 2 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air.

In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device.

As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IoT) standard. Examples of such machines or devices are sensors, metering devices such as power meters, industrial machinery, or home or personal appliances (e.g. refrigerators, televisions, etc.) personal wearables (e.g., watches, fitness trackers, etc.).

In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114.

Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips.

In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner.

In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected).

User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry.

Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 2. For simplicity, the wireless network of FIG. 2 only depicts network 106, network nodes 160 and 160*b*, and WDs 110, 110*b*, and 110*c*. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

Figure 3:
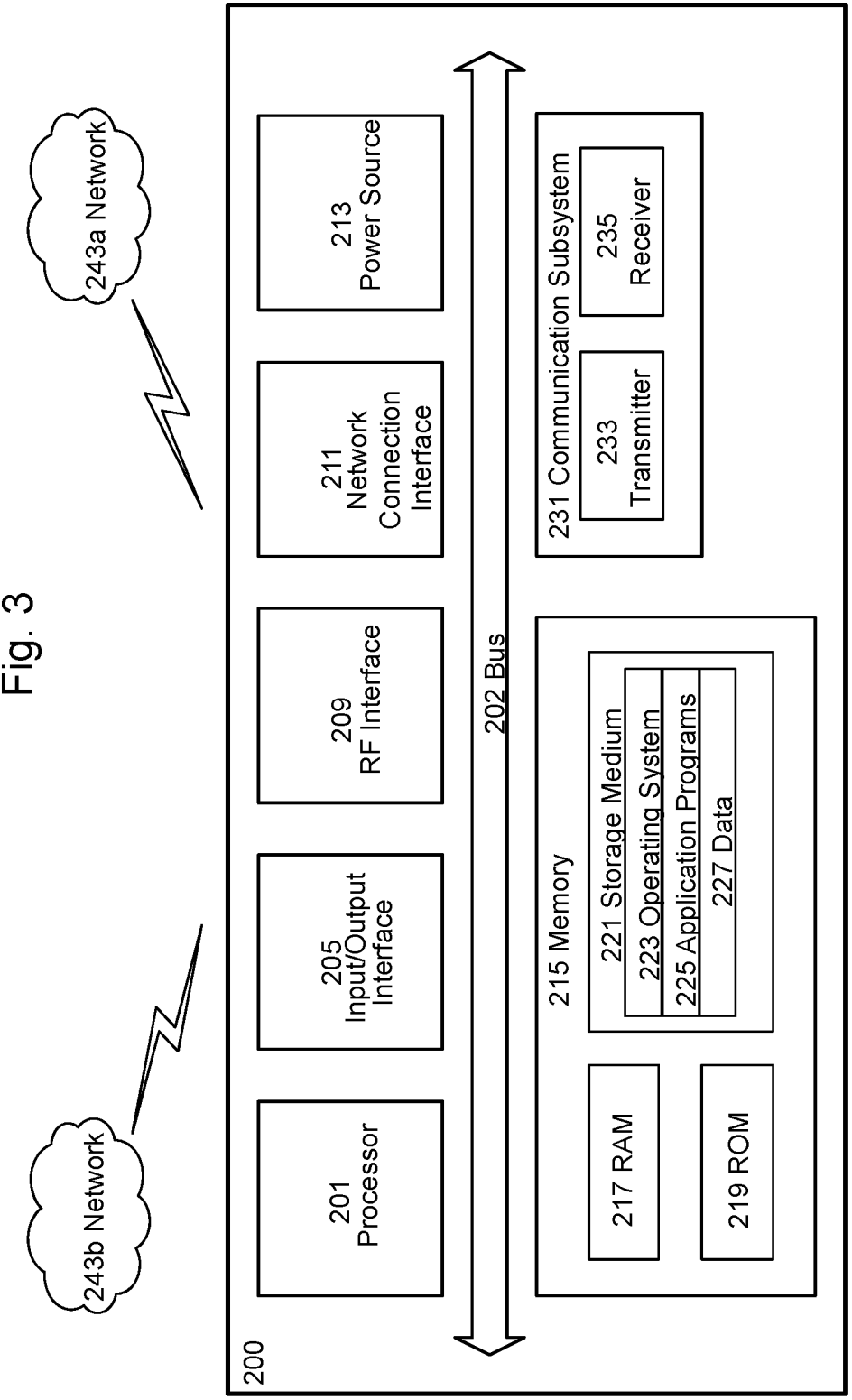
FIG. 3 illustrates an example user equipment, according to certain embodiments.

FIG. 3 illustrates an example user equipment, according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the 3rd Generation Partnership Project (3GPP), including a NB-IoT UE, a machine type communication (MTC) UE, and/or an enhanced MTC (eMTC) UE. UE 200, as illustrated in FIG. 3, is one example of a WD configured for communication in accordance with one or more communication standards promulgated by the 3rd Generation Partnership Project (3GPP), such as 3GPP's GSM, UMTS, LTE, and/or NR standards. As mentioned previously, the term WD and UE may be used interchangeable. Accordingly, although FIG. 3 is a UE, the components discussed herein are equally applicable to a WD, and vice-versa.

In FIG. 3, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 213, and/or any other component, or any combination thereof. Storage medium 221 includes operating system 223, application program 225, and data 227. In other embodiments, storage medium 221 may include other similar types of information. Certain UEs may use all the components shown in FIG. 3, or only a subset of the components. The level of integration between the components may vary from one UE to another UE. Further, certain UEs may contain multiple instances of a component, such as multiple processors, memories, transceivers, transmitters, receivers, etc.

In FIG. 3, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205.

An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof.

UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 3, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory.

Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 3, processing circuitry 201 may be configured to communicate with network 243*b* using communication subsystem 231. Network 243*a* and network 243*b* may be the same network or networks or different network or networks. Communication subsystem 231 may be configured to include one or more transceivers used to communicate with network 243*b*. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243*b* may encompass wired and/or wireless networks such as a local-area network (LAN), a wide-area network (WAN), a computer network, a wireless network, a telecommunications network, another like network or any combination thereof. For example, network 243*b* may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 4:
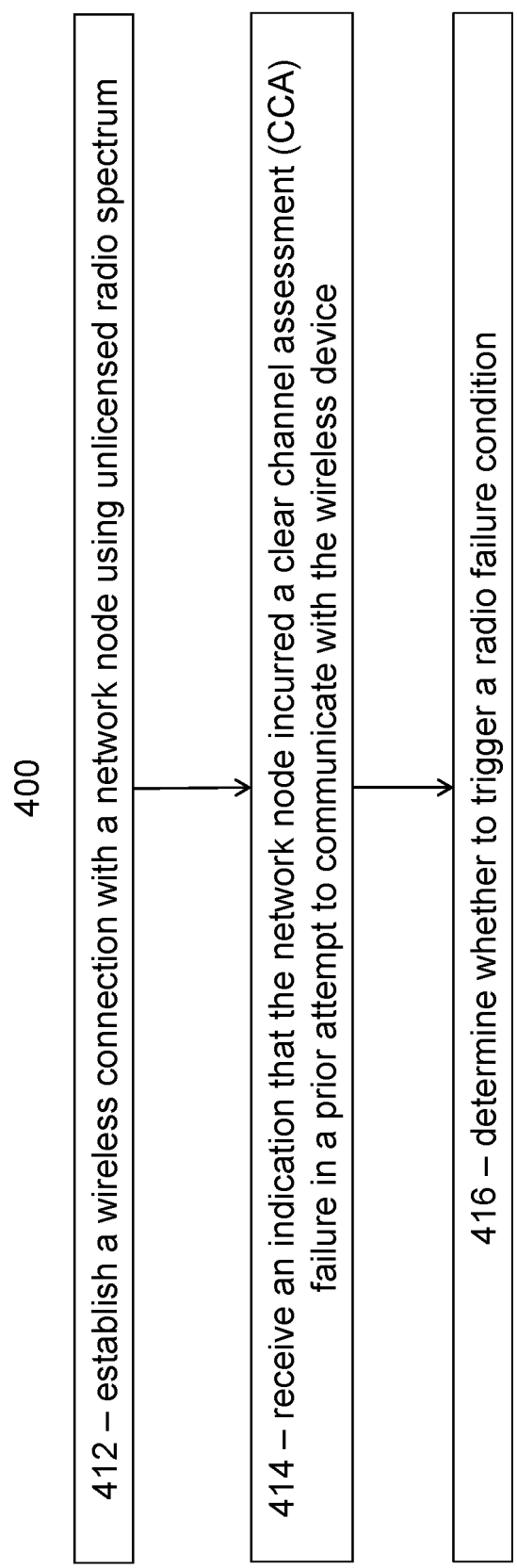
FIG. 4 is a flowchart illustrating an example method in a wireless device, according to certain embodiments.

FIG. 4 is a flowchart illustrating an example method in a wireless device, according to certain embodiments. In particular embodiments, one or more steps of FIG. 4 may be performed by wireless device 110 described with respect to FIG. 2. The wireless device is operable to detect a downlink radio failure.

The method begins at step 412, where the wireless device (e.g., wireless device 110) establishes a wireless connection with a network node using unlicensed radio spectrum. The connection may be mobile originated or mobile terminated. The wireless device may operate in license assisted access or standalone mode. The wireless device may be using NR-U.

At step 414, the wireless device receives an indication that the network node incurred a CCA failure in a prior attempt to communicate with the wireless device.

In particular embodiments, the indication of the CCA failure is received via a physical PBCH. The indication of the CCA failure may be received outside of the MIB of the PBCH. The indication of the CCA failure may be received via a SIB. The indication of the CCA failure may be received via a GC-PDCCH. The indication of the CCA failure may be received together with at least one of DCI, MAC CE, and RRC signaling.

In particular embodiments, the indication of the CCA failure comprises a single bit and indicates whether one more CCA failures occurred. Thee indication of the CCA failure may comprise more than a single bit and indicate an amount of CCA failures that occurred.

In particular embodiments, the indication of the CCA failure comprises an indication of an availability of channels or carriers. For example, based on CCA activity, the network node may determine which channels or carriers are available and send an indication of those channels to the wireless device.

In particular embodiments, the indication of the CCA failure is related to one or more beams. The indication of the CCA failure may be related to one or more beams that correspond to a beam on which the wireless device received the indication of the CCA failure.

In particular embodiments, the indication of the CCA failure comprises a ratio of CCA failures to successful transmissions by the network node to the wireless device.

In particular embodiments, the network node incurred the CCA failure when attempting to transmit a reference signal to the wireless device.

In particular embodiments, the wireless device may receive the indication according to any of the embodiments and examples described above and/or elsewhere herein.

At step 416, the wireless device, in response to the indication of the CCA failure, determines whether to trigger a radio failure condition. For example, if the indication of the CCA failure indicates a failure above a particular threshold amount, the wireless device may declare a radio link failure (RLF) and/or the wireless device may initiate a handover procedure.

Modifications, additions, or omissions may be made to method 400 of FIG. 4. Additionally, one or more steps in the method of FIG. 4 may be performed in parallel or in any suitable order.

Figure 5:
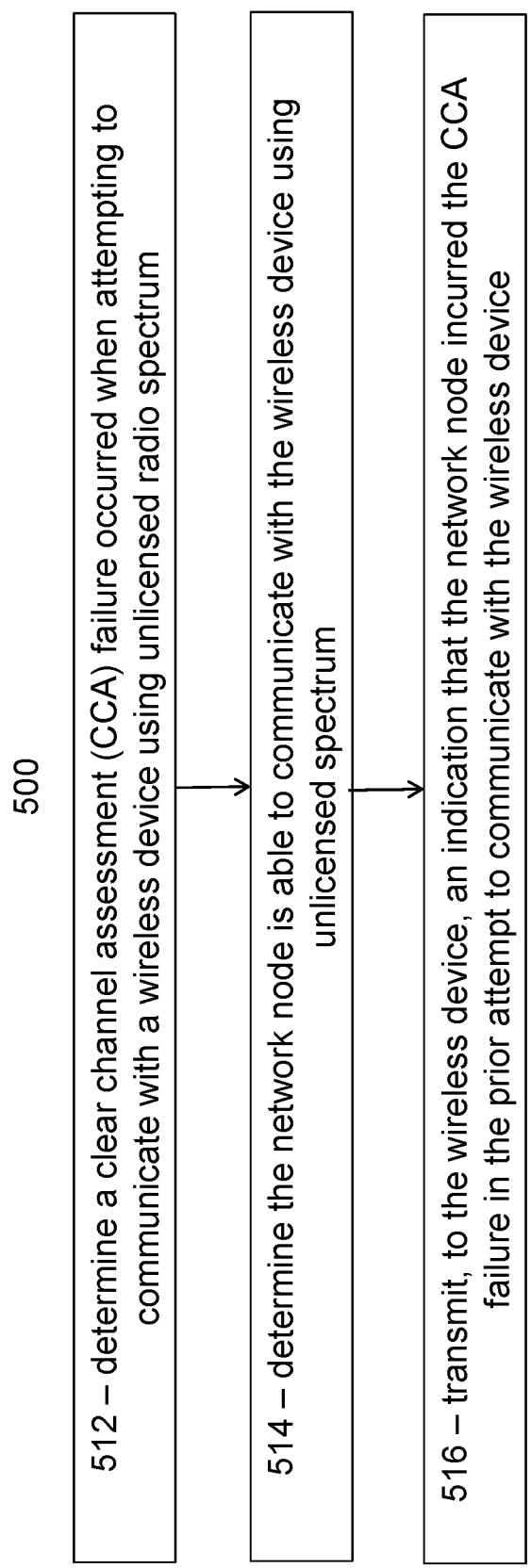
FIG. 5 is a flowchart illustrating an example method in a network node, according to certain embodiments.

FIG. 5 is a flowchart illustrating an example method in a network node, according to certain embodiments. In particular embodiments, one or more steps of FIG. 5 may be performed by network node 160 described with respect to FIG. 2.

The method begins at step 512, where the network node (e.g., network node 160) determines a CCA failure occurred when attempting to communicate with a wireless device using unlicensed radio spectrum. For example, the network node may obtain information to be sent to a wireless device, such as wireless device 110, via unlicensed spectrum. The information may be data, control information, signalling, or any other type of information that needs to be communicated from the base station to the wireless device. The information may comprise a reference signal periodically transmitted to the wireless device.

Then network node may determine that the downlink channel is currently occupied when performing a CCA before transmitting the information. Because the downlink channel is occupied, the network node is unable to send the information. Therefore, the network node has to wait for the downlink channel to be open or available.

At step 514, the network node determines it is able to communicate with the wireless device using unlicensed spectrum. For example, the network node may perform a successful CCA.

At step 516, the network node transmits to the wireless device an indication that the network node incurred the CCA failure in the prior attempt to communicate with the wireless device.

In particular embodiments, the indication of the CCA failure is transmitted via a PBCH. The indication of the CCA failure may be transmitted outside of the MIB of the PBCH. The indication of the CCA failure may be transmitted via a SIB. The indication of the CCA failure may transmitted via a GC-PDCCH. The indication of the CCA failure may be transmitted together with at least one of DCI, MAC CE, and RRC signaling.

In particular embodiments, the indication of the CCA failure comprises a single bit and indicates whether one more CCA failures occurred. The indication of the CCA failure may comprise more than a single bit and indicate an amount of CCA failures that occurred.

In particular embodiments, the indication of the CCA failure comprises an indication of an availability of channels or carriers. For example, based on CCA activity, the network node may determine which channels or carriers are available and send an indication of those channels to the wireless device.

In particular embodiments, the indication of the CCA failure is related to one or more beams. The indication of the CCA failure may be related to one or more beams that correspond to a beam on which the network node transmitted the indication of the CCA failure.

In particular embodiments, the indication of the CCA failure comprises a ratio of CCA failures to successful transmissions by the network node to the wireless device.

In particular embodiments, the network node incurred the CCA failure when attempting to transmit a reference signal to the wireless device.

In particular embodiments, the network node may transmit the indication according to any of the embodiments and examples described above and/or elsewhere herein.

Modifications, additions, or omissions may be made to method 500 of FIG. 5. Additionally, one or more steps in the method of FIG. 5 may be performed in parallel or in any suitable order.

Figure 6:
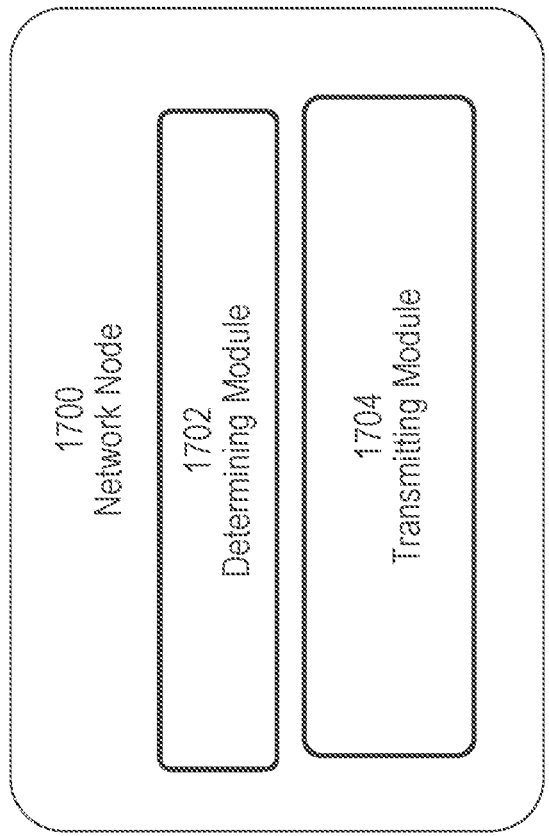
FIG. 6 illustrates a schematic block diagram of a wireless device and network node in a wireless network, according to certain embodiments.
Figure 6:
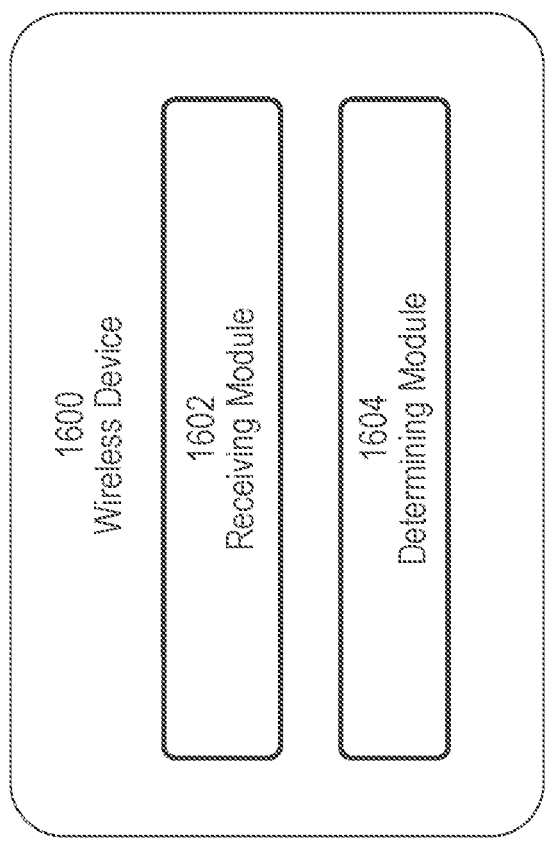

FIG. 6 illustrates a schematic block diagram of two apparatuses in a wireless network (for example, the wireless network illustrated in FIG. 2). The apparatuses include a wireless device and a network node (e.g., wireless device 110 and network node 160 illustrated in FIG. 7). Apparatuses 1600 and 1700 are operable to carry out the example methods described with reference to FIGS. 4 and 5, respectively, and possibly any other processes or methods disclosed herein. It is also to be understood that the methods of FIGS. 4 and 5 are not necessarily carried out solely by apparatuses 1600 and/or 1700. At least some operations of the methods can be performed by one or more other entities.

Virtual apparatuses 1600 and 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

In some implementations, the processing circuitry may be used to cause receiving module 1602, determining module 1604, and any other suitable units of apparatus 1600 to perform corresponding functions according one or more embodiments of the present disclosure. Similarly, the processing circuitry described above may be used to cause determining module 1702, transmitting module 1704, and any other suitable units of apparatus 1700 to perform corresponding functions according one or more embodiments of the present disclosure.

As illustrated in FIG. 6, apparatus 1600 includes receiving module 1602 configured to receive an indication of CCA failures from a network node, according to any of the embodiments and examples described herein. Determining module 1604 is configured to determine, based on the indication of CCA failures, whether to whether to trigger a radio failure condition, according to any of the embodiments and examples described herein.

As illustrated in FIG. 6, apparatus 1700 includes determining module 1702 configured to determine and count, track, or estimate CCA failures, according to any of the embodiments and examples described herein. Transmitting module 1704 is configured to transmit and indication of CCA failures to a wireless device, according to any of the embodiments and examples described herein.

Figure 7:
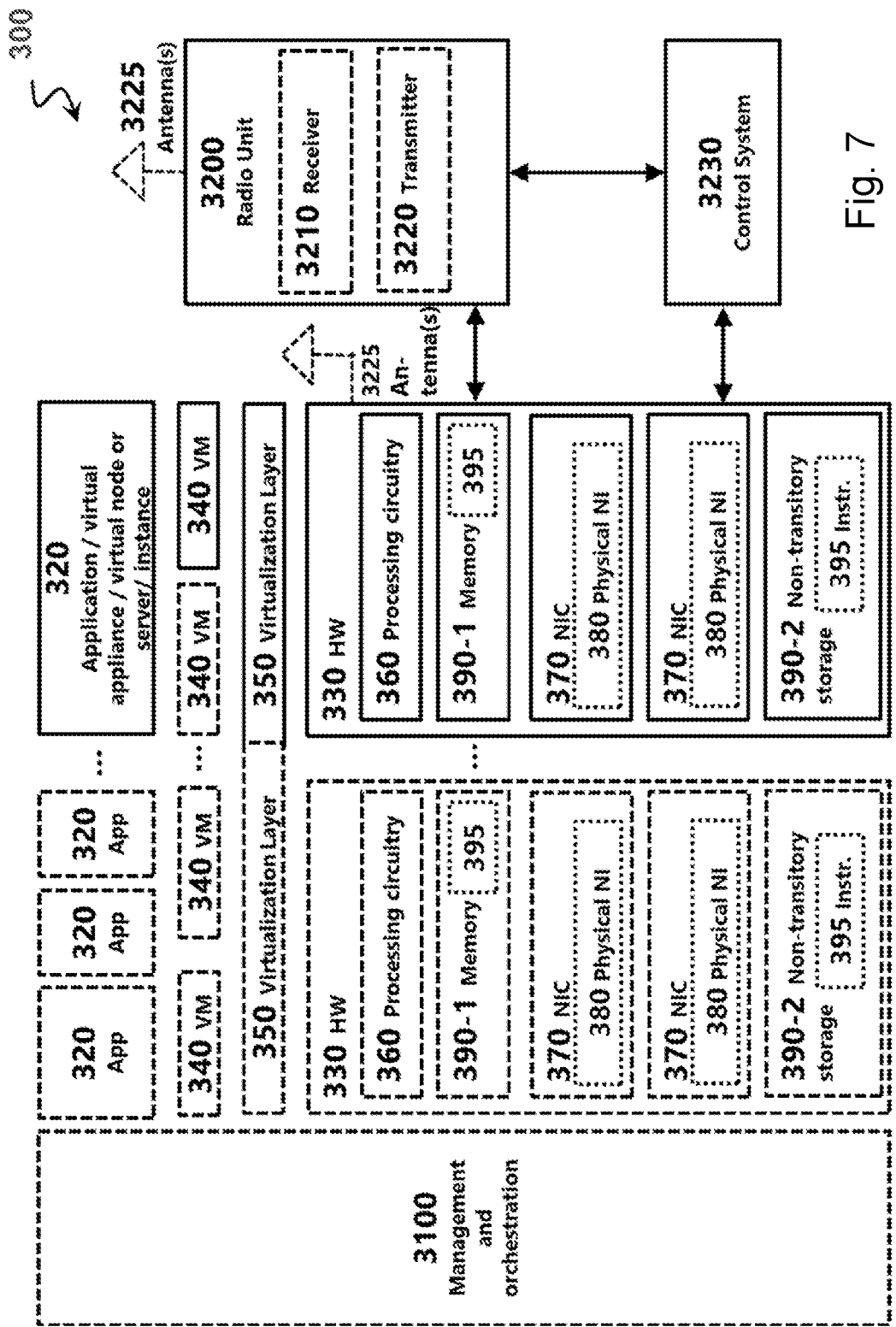
FIG. 7 illustrates an example virtualization environment, according to certain embodiments.

FIG. 7 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 7, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Figure 8:
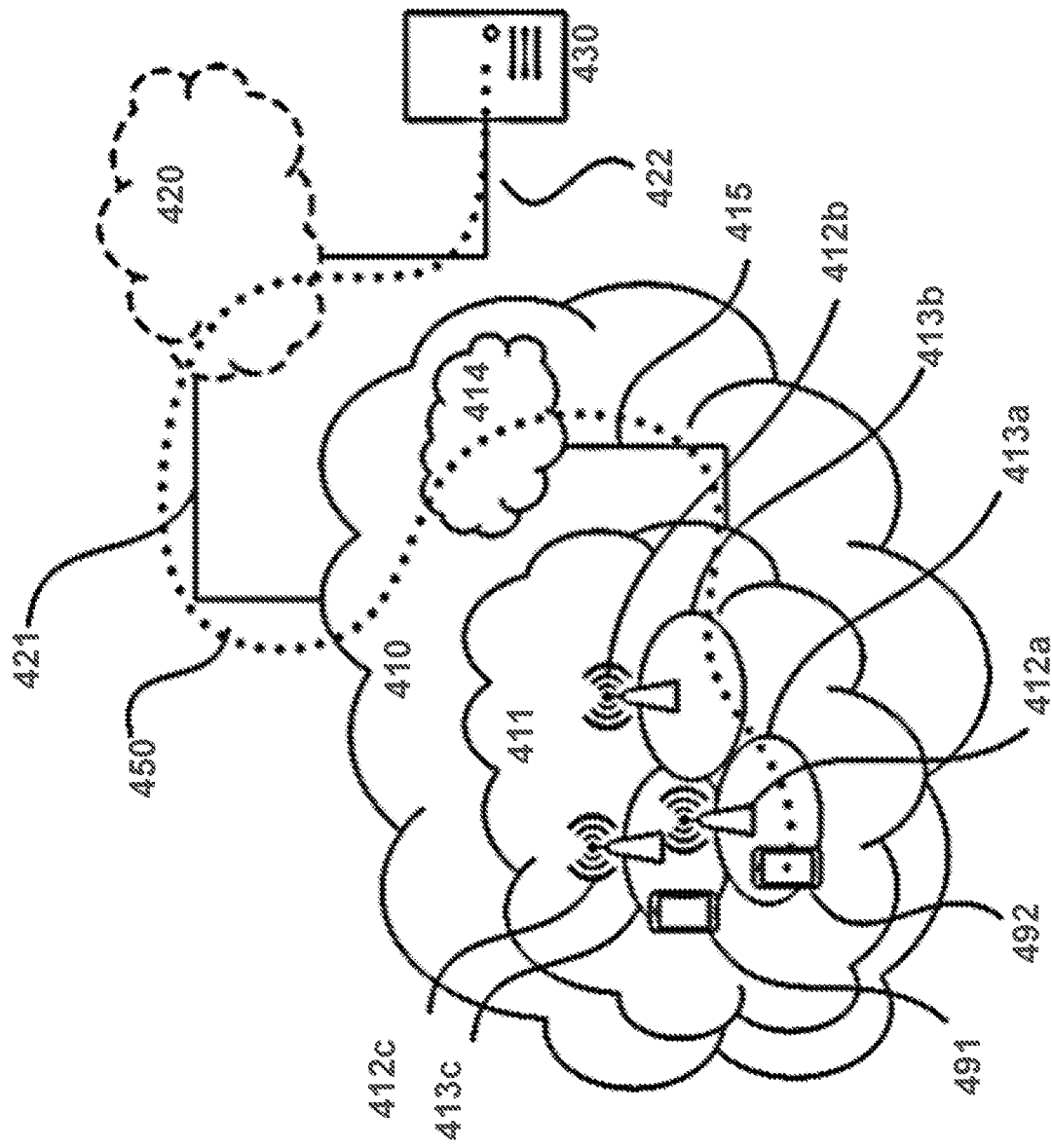
FIG. 8 illustrates an example telecommunication network connected via an intermediate network to a host computer, according to certain embodiments.

Still in the context of NFV, Virtual Network Function (VNF) is responsible for handling specific network functions that run in one or more virtual machines 340 on top of hardware networking infrastructure 330 and corresponds to application 320 in FIG. 8.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

With reference to FIG. 8, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 8 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 9:
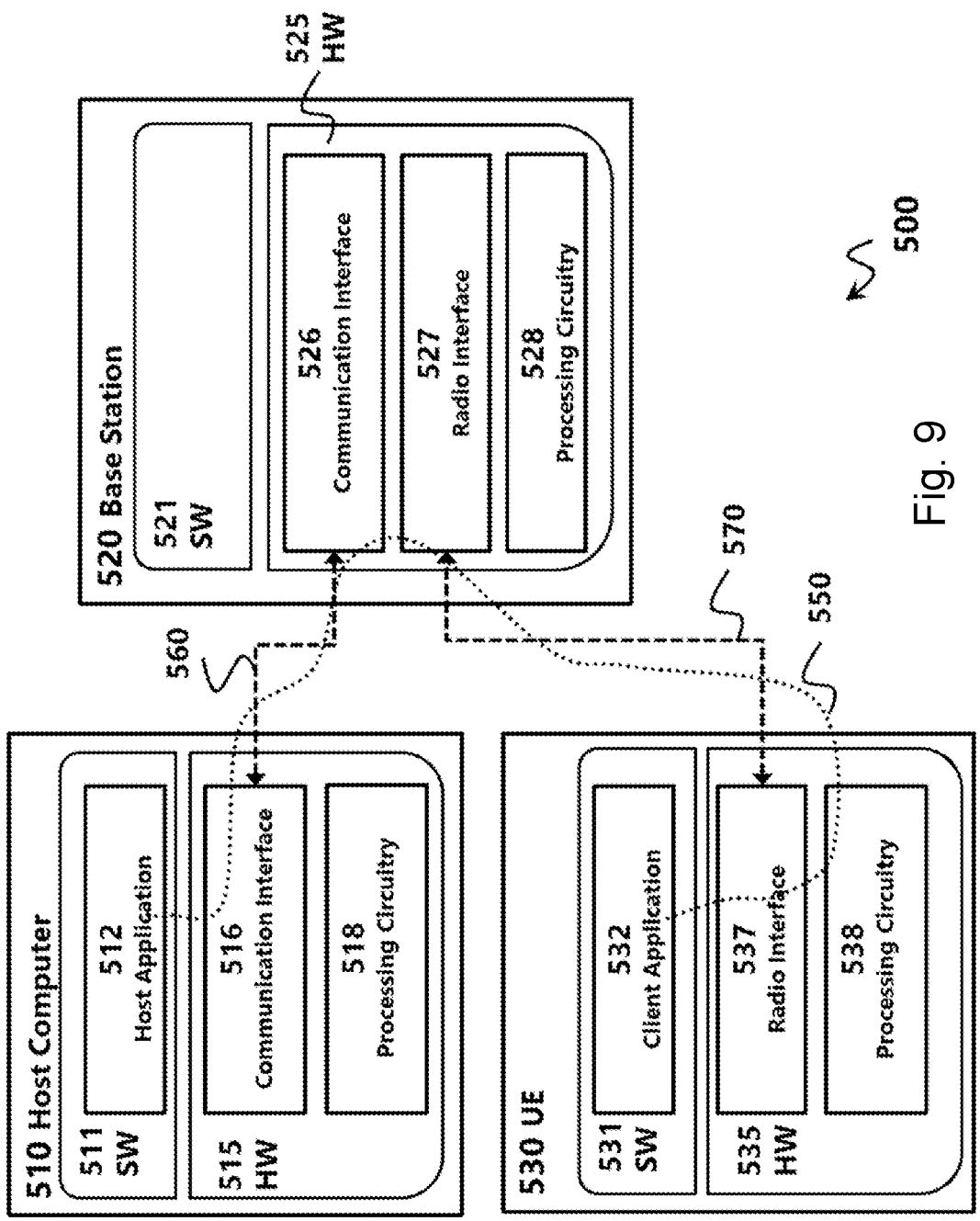
FIG. 9 illustrates an example host computer communicating via a base station with a user equipment over a partially wireless connection, according to certain embodiments.

FIG. 9 illustrates an example host computer communicating via a base station with a user equipment over a partially wireless connection, according to certain embodiments. Example implementations, in accordance with an embodiment of the UE, base station and host computer discussed in the preceding paragraphs will now be described with reference to FIG. 9. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 9) served by base station 520. Communication interface 526 may be configured to facilitate connection 560 to host computer 510. Connection 560 may be direct, or it may pass through a core network (not shown in FIG. 9) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 9 may be similar or identical to host computer 430, one of base stations 412*a*, 412*b*, 412*c* and one of UEs 491, 492 of FIG. 8, respectively. This is to say, the inner workings of these entities may be as shown in FIG. 9 and independently, the surrounding network topology may be that of FIG. 8.

In FIG. 9, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., based on load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the signaling overhead and reduce latency, and thereby provide benefits such as reduced user waiting time, better responsiveness and extended battery life.

A measurement procedure may be provided for monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 10:
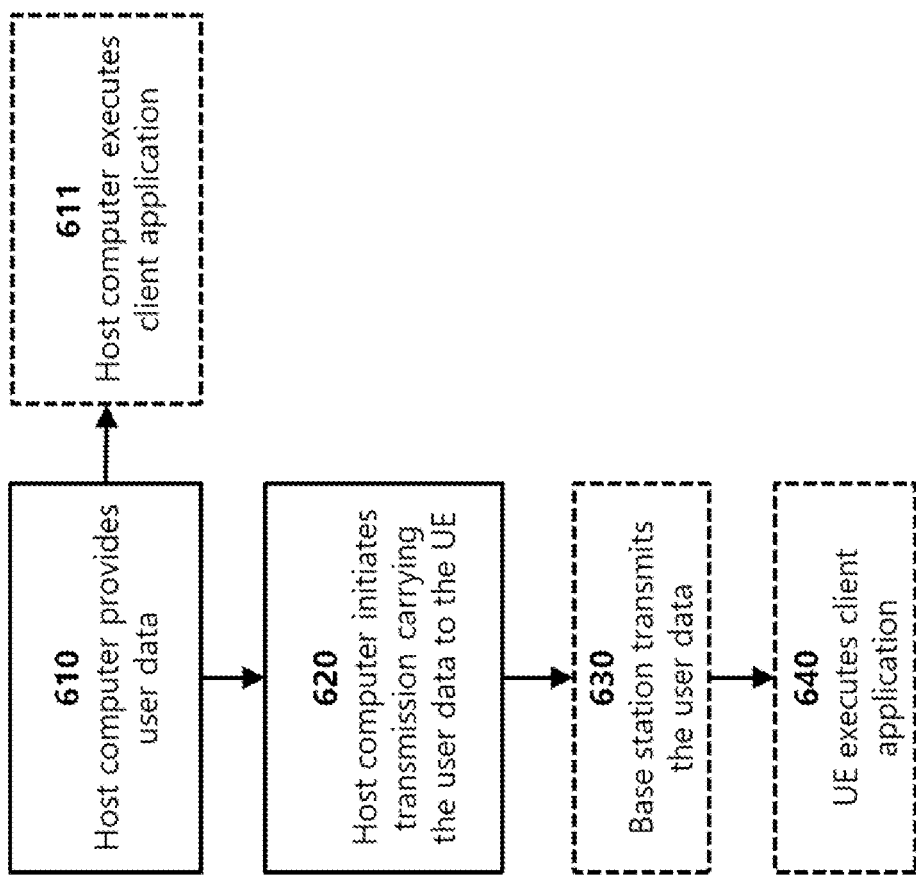
FIG. 10 is a flowchart illustrating a method implemented, according to certain embodiments.

FIG. 10 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 10 will be included in this section.

In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 11:
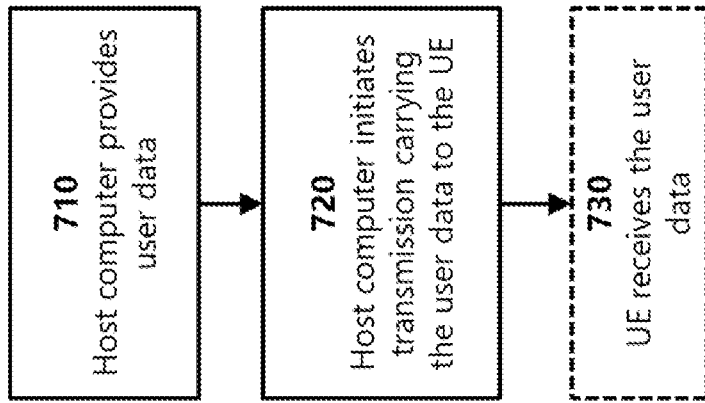
FIG. 11 is a flowchart illustrating a method implemented in a communication system, according to certain embodiments.

FIG. 11 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 11 will be included in this section.

In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 12:
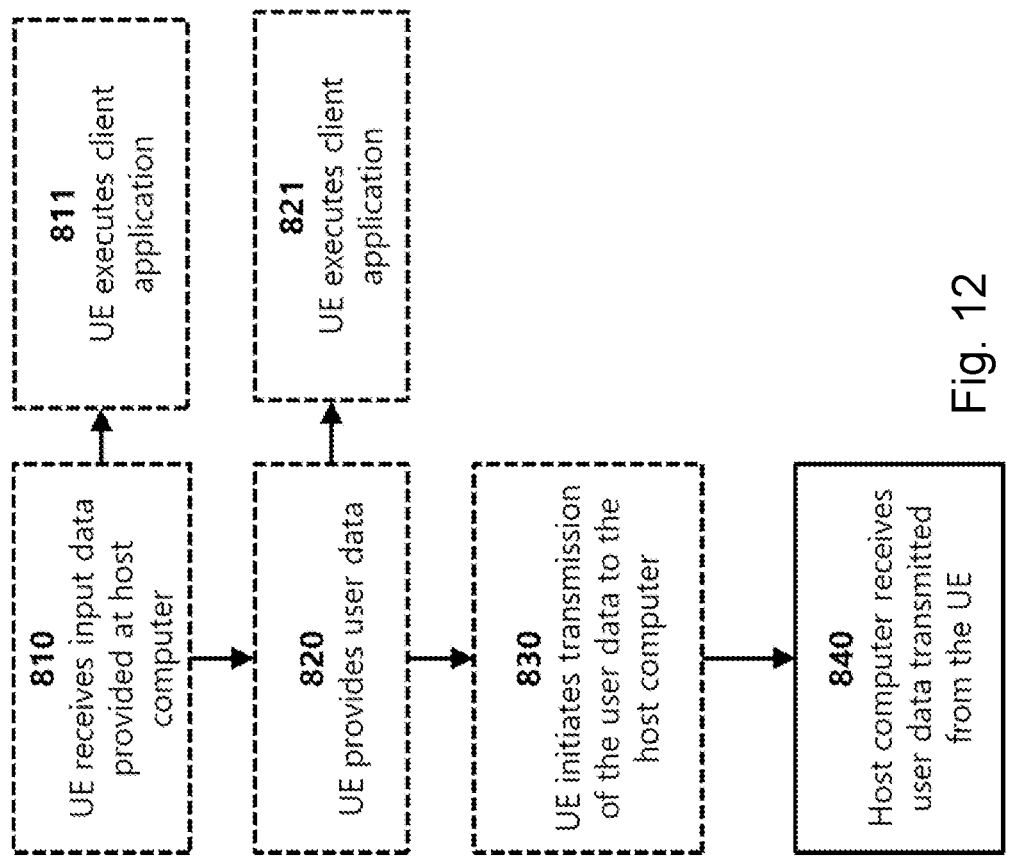
FIG. 12 is a flowchart illustrating a method implemented in a communication system, according to certain embodiments.

FIG. 12 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 12 will be included in this section.

In step 810 (which may be optional), the UE receives input data provided by the host computer. Additionally, or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 13:
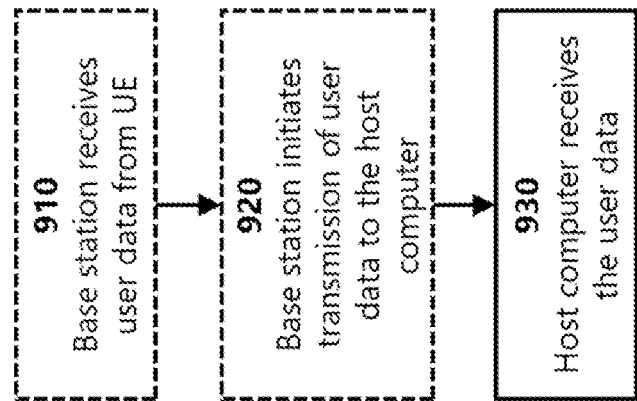
FIG. 13 is a flowchart illustrating a method implemented in a communication system, according to certain embodiments.

FIG. 13 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 13 will be included in this section.

In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the claims below.

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ACK Acknowledgment
ARQ Automatic Repeat Request
ASN.1 Abstract Syntax Notation One
AWGN Additive White Gaussian Noise
BCCH Broadcast Control Channel
BCH Broadcast Channel
BWP Bandwidth Part
CA Carrier Aggregation
CAPC Channel Access Priority Class
CCA Clear Channel Assessment
CC Carrier Component
CCCH SDU Common Control Channel SDU
CDMA Code Division Multiple Access
CGI Cell Global Identifier
CIR Channel Impulse Response
COT Channel Occupancy Time
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
CWS Contention Window Size
DCCH Dedicated Control Channel
DCI Downlink Control Information
DL Downlink
DM Demodulation
DMRS Demodulation Reference Signal
DMTC DRS Measurement Time Configuration
DRS Discovery Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
ED Energy Detection
EDGE Enhanced Data rates for GSM Evolution
eLAA Enhanced License Assisted Access
EN-DC E-UTRAN New Radio Dual Connectivity
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
ETSI European Telecommunications Standards Institute
FDD Frequency Division Duplex
feLAA Further Enhanced License Assisted Access
FFS For Further Study
GC-PDCCH Group Common PDCCH
GERAN GSM EDGE Radio Access Network
gNB Base station in NR
GNSS Global Navigation Satellite System
GPRS General Packet Radio Service
GSM Global System for Mobile communication
HARQ Hybrid Automatic Repeat Request
HO Handover
HSPA High Speed Packet Access
HRPD High Rate Packet Data
LAA License Assisted Access
LBT Listen-Before-Talk
LOS Line of Sight
LPP LTE Positioning Protocol
LTE Long-Term Evolution
MAC Medium Access Control
MAC CE MAC Control Element
MBMS Multimedia Broadcast Multicast Services
MBSFN Multimedia Broadcast multicast service Single Frequency Network
MBSFN ABS MBSFN Almost Blank Subframe
MCOT Maximum Channel Occupancy Time
MDT Minimization of Drive Tests
MHz Megahertz
MIB Master Information Block
MME Mobility Management Entity
MS millisecond
μs microsecond
MSC Mobile Switching Center
NGC Next Generation Core network
NPDCCH Narrowband Physical Downlink Control Channel
NR New Radio
NR-U NR Unlicensed (NR operation in unlicensed spectrum)
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PCell Primary Cell
PBCH Physical Broadcast Channel
P-CCPCH Primary Common Control Physical Channel
PCell Primary Cell
PCFICH Physical Control Format Indicator Channel
PDCCH Physical Downlink Control Channel
PDCP Packet Data Convergence Protocol
PDP Profile Delay Profile
PDSCH Physical Downlink Shared Channel
PDU Protocol Data Unit
PSCell Primary Secondary Cell
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
QCI QoS Class Indicator
QoS Quality of Service
RAN Radio Access Network
RAT Radio Access Technology
RLC Radio Link Control
RLF Radio Link Failure
RLM Radio Link Management or Monitoring
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power RSRQ Reference Signal Received Quality OR Reference Symbol Received Quality
RSSI Received Signal Strength Indicator
RSTD Reference Signal Time Difference
SCH Synchronization Channel
SCell Secondary Cell
UCI Uplink Control Information
UE User equipment
UL Uplink
WCDMA Wideband Code Division Multiple Access
SDAP Service Data Adaptation Protocol
SDU Service Data Unit
SFN System Frame Number
SGW Serving Gateway
SI System Information
SIB System Information Block
SINR Signal to Interference and Noise Ratio
SNR Signal to Noise Ratio
SON Self Optimized Network
SS Synchronization Signal
SSB Synchronization Signal Block
SSS Secondary Synchronization Signal
TDD Time Division Duplex
TDOA Time Difference of Arrival
TOA Time of Arrival
TS Technical Specification
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a wireless device for detecting a downlink radio failure, the method comprising:
   establishing a wireless connection with a network node using unlicensed radio spectrum;
   receiving an indication that the network node incurred a clear channel assessment (CCA) failure in a prior attempt to communicate with the wireless device, wherein the indication of the CCA failure comprises a ratio of CCA failures to successful transmissions by the network node to the wireless device; and
   in response to the indication of the CCA failure, determining whether to trigger a radio failure condition.

2. A wireless device operable to detect a downlink radio failure, the wireless device comprising processing circuitry operable to:
   establish a wireless connection with a network node using unlicensed radio spectrum;
   receive an indication that the network node incurred a clear channel assessment (CCA) failure in a prior attempt to communicate with the wireless device, wherein the indication of the CCA failure comprises a ratio of CCA failures to successful transmissions by the network node to the wireless device; and
   in response to the indication of the CCA failure, determine whether to trigger a radio failure condition.

3. The wireless device of claim 2, wherein the indication of the CCA failure is received via a physical broadcast channel (PBCH).

4. The wireless device of claim 3, wherein the indication of the CCA failure is received outside of the master information block (MIB) of the PBCH.

5. The wireless device of claim 2, wherein the indication of the CCA failure is received via a system information block (SIB).

6. The wireless device of claim 2, wherein the indication of the CCA failure is received via a group common physical downlink control channel (GC-PDCCH).

7. The wireless device of claim 2, wherein the indication of the CCA failure is received together with at least one of downlink control information (DCI), medium access control (MAC) control element (CE), and radio resource control (RRC) signaling.

8. The wireless device of claim 2, wherein the indication of the CCA failure comprises a single bit and indicates whether one more CCA failures occurred.

9. The wireless device of claim 2, wherein the indication of the CCA failure comprises more than a single bit and indicates an amount of CCA failures that occurred.

10. The wireless device of claim 2, wherein the indication of the CCA failure comprises an indication of an availability of channels or carriers.

11. The wireless device of claim 2, wherein the indication of the CCA failure is related to one or more beams.

12. The wireless device of claim 2, wherein the indication of the CCA failure is related to one or more beams that correspond to a beam on which the wireless device received the indication of the CCA failure.

13. The wireless device of claim 2, wherein the network node incurred the CCA failure when attempting to transmit a reference signal to the wireless device.

14. A method performed by a network node, the method comprising:
   determining a clear channel assessment (CCA) failure occurred when attempting to communicate with a wireless device using unlicensed radio spectrum;
   determining the network node is able to communicate with the wireless device using the unlicensed radio spectrum; and
   transmitting, to the wireless device, an indication that the network node incurred the CCA failure in a prior attempt to communicate with the wireless device, wherein the indication of the CCA failure comprises a ratio of CCA failures to successful transmissions by the network node to the wireless device.

15. A network node comprising processing circuitry operable to:
   determine a clear channel assessment (CCA) failure occurred when attempting to communicate with a wireless device using unlicensed radio spectrum;
   determine the network node is able to communicate with the wireless device using the unlicensed radio spectrum; and
   transmit, to the wireless device, an indication that the network node incurred the CCA failure in a prior attempt to communicate with the wireless device, wherein the indication of the CCA failure comprises a ratio of CCA failures to successful transmissions by the network node to the wireless device.

16. The network node of claim 15, wherein the indication of the CCA failure is transmitted via a physical broadcast channel (PBCH).

17. The network node of claim 16, wherein the indication of the CCA failure is transmitted outside of the master information block (MIB) of the PBCH.

18. The network node of claim 15, wherein the indication of the CCA failure is transmitted via a system information block (SIB).

19. The network node of claim 15, wherein the indication of the CCA failure is transmitted via a group common physical downlink control channel (GC-PDCCH).

20. The network node of claim 15, wherein the indication of the CCA failure is transmitted together with at least one of downlink control information (DCI), medium access control (MAC) control element (CE), and radio resource control (RRC) signaling.

21. The network node of claim 15, wherein the indication of the CCA failure comprises a single bit and indicates whether one more CCA failures occurred.

22. The network node of claim 15, wherein the indication of the CCA failure comprises more than a single bit and indicates an amount of CCA failures that occurred.

23. The network node of claim 15, wherein the indication of the CCA failure comprises an indication of an availability of channels or carriers.

24. The network node of claim 15, wherein the indication of the CCA failure is related to one or more beams.

25. The network node of claim 15, wherein the indication of the CCA failure is related to one or more beams that correspond to a beam on which the network node transmitted the indication of the CCA failure.

26. The network node of claim 15, wherein the network node incurred the CCA failure when attempting to transmit a reference signal to the wireless device.

* * * * *